(12) United States Patent
Chertoff

(10) Patent No.: US 12,707,027 B2
(45) Date of Patent: Aug. 11, 2026

(54) SEE THROUGH VIEWING SYSTEM FOR VEHICLE

(71) Applicant: GM Global Technology Operations LLC, Detroit, MI (US)

(72) Inventor: David Chertoff, Zikhron Ya'akov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/928,743

(22) Filed: Oct. 28, 2024

(65) Prior Publication Data

US 2026/0122204 A1 Apr. 30, 2026

(51) Int. Cl.

| | |
|---|---|
| ***H04N 7/18*** | (2006.01) |
| ***G06F 3/01*** | (2006.01) |
| ***G06T 7/70*** | (2017.01) |
| ***G06V 20/58*** | (2022.01) |
| ***G06V 20/70*** | (2022.01) |

(52) U.S. Cl.

CPC ............. *H04N 7/181* (2013.01); *G06F 3/012* (2013.01); *G06T 7/70* (2017.01); *G06V 20/58* (2022.01); *G06V 20/70* (2022.01); *G06T 2207/30252* (2013.01)

(58) Field of Classification Search

None

See application file for complete search history.

(56) References Cited

U.S. PATENT DOCUMENTS

| | | | | |
|---|---|---|---|---|
| 2020/0034638 A1* | 1/2020 | Brewington | ......... | G05D 1/0231 |
| 2022/0109812 A1* | 4/2022 | Lamm | ..................... | G06T 11/00 |
| 2022/0382050 A1* | 12/2022 | Moll | ...................... | B60K 35/00 |
| 2023/0055289 A1* | 2/2023 | Bianculli | ............... | G06V 20/59 |

(Continued)

FOREIGN PATENT DOCUMENTS

| | | | | |
|---|---|---|---|---|
| CA | 3077430 A1 * | 4/2019 | ............... | G06T 7/13 |
| CA | 2935434 C * | 10/2020 | ........... | H04N 13/395 |

(Continued)

OTHER PUBLICATIONS

Translation for DE102017209802 (Year: 2018).*

German Office Action for German Application No. 102024139727.6; dated Aug. 20, 2025; 4 pages.

*Primary Examiner* — Ricky Chin

(74) *Attorney, Agent, or Firm* — CANTOR COLBURN LLP

(57) ABSTRACT

A see through vision system for a vehicle includes a surround view system having exterior facing cameras. The exterior facing cameras are in communication with a controller. A driver monitoring system includes a driver monitoring sensor configured to monitor a viewing direction of a driver. The controller includes a memory storing a three dimensional model of the vehicle, a simultaneous localization and mapping (SLAM) module, a surround view module, and a data link for connecting to a wearable vision system. The controller further stores instructions for identifying a viewing direction of the driver using the driver monitoring system, identifying at least one opaque portion of the vehicle in the driver's view using the viewing direction and the three dimensional model of the vehicle, generating a cropped live video of an exterior view of the vehicle at the locations of the at least one opaque portion using the surround view module.

20 Claims, 2 Drawing Sheets

(56) References Cited

U.S. PATENT DOCUMENTS

| | | | | |
|---|---|---|---|---|
| 2023/0384600 | A1 * | 11/2023 | Neimark | G06T 7/11 |
| 2024/0302894 | A1 * | 9/2024 | Bauernfeind | G06F 3/011 |
| 2025/0163671 | A1 * | 5/2025 | Hurwitz | G01S 17/89 |

FOREIGN PATENT DOCUMENTS

| | | | | |
|---|---|---|---|---|
| DE | 102014207398 | A1 | 10/2015 | |
| DE | 102016120427 | A1 * | 4/2017 | B60R 21/04 |
| DE | 102017209802 | A1 * | 12/2018 | G06F 3/011 |
| DE | 102017129214 | B4 * | 1/2024 | B66F 9/0755 |
| TW | 201742020 | A * | 12/2017 | G01S 17/08 |
| WO | WO-2024059206 | A1 * | 3/2024 | G06T 19/006 |

* cited by examiner

SEE THROUGH VIEWING SYSTEM FOR VEHICLE

The subject disclosure relates to vehicles, and in particular, to a system for visualizing an exterior environment through opaque portions of a vehicle.

Operation of a vehicle requires the operator to be aware of a surrounding environment. However, portions of the vehicle are opaque, or otherwise obscured, and the vehicle operator cannot see a full surrounding environment. Vehicles address this shortcoming through the use of mirrors, exterior facing cameras, vision systems and the like. However, such systems can still provide insufficient information or awareness to the vehicle operator as they provide the information about the surroundings at screens away from where the operator may be looking at locations that are static within the vehicle and that may not be intuitive.

Accordingly, it is desirable to provide a system for intuitively viewing an external environment surrounding a vehicle from a vehicle operator position, combining the viewable areas and the obstructed areas in a continuous and natural way.

SUMMARY

In one exemplary embodiment a see through vision system for a vehicle includes a surround view system having multiple exterior facing cameras. Each of the exterior facing cameras is in communication with a controller. A driver monitoring system includes at least one driver monitoring sensor configured to monitor a viewing direction of a driver. The at least one driver monitoring sensor is in communication with the controller. The controller includes a non-transitory memory storing a three dimensional model of the vehicle, a simultaneous localization and mapping (SLAM) module, a surround view module, and a data link for connecting to a wearable vision system. The controller further stores instructions for identifying a viewing direction of the driver using the driver monitoring system, identifying at least one opaque portion of the vehicle in the driver's view using the viewing direction and the three dimensional model of the vehicle, generating a cropped live video of an exterior view of the vehicle at the locations of the at least one opaque portion using the surround view module, and exporting the generated cropped live video to the wearable vision system using the data link.

In addition to one or more of the features described herein the at least one driver monitoring sensor includes an interior facing camera defining a field of view including a head of the driver.

In addition to one or more of the features described herein the SLAM module is configured to determine a position and orientation of the wearable vision system relative to the vehicle based at least in part on the viewing direction of the driver using a simultaneous localization and mapping algorithm.

In addition to one or more of the features described herein the SLAM module is further configured to receive at least one of sensor information and image information from the wearable vision system through the data link, and the SLAM module is configured to determine a position and orientation of the wearable vision system relative to the vehicle based at least in part on the viewing direction of the driver and the at least one of sensor information and image information from the wearable vision system.

In addition to one or more of the features described herein the simultaneous localization and mapping algorithm is performed exclusively on the controller.

In addition to one or more of the features described herein the image information includes an image feed captured from a camera disposed on the wearable vision system.

In addition to one or more of the features described herein the image information further includes object identification of objects in the image feed.

In addition to one or more of the features described herein the SLAM module is further configured to determine the position and orientation of the wearable vision system relative to the vehicle based at least in part on the identification of objects in the image feed.

In addition to one or more of the features described herein the three dimensional model of the vehicle defines relative positions and sizes of structural elements of the vehicle and defines which structural elements of the vehicle are opaque.

In addition to one or more of the features described herein the vehicle further includes a set of vehicle operation sensors, the vehicle operation sensors being configured to identify a vehicle driving speed, vehicle location, hazard identification, warning signals, driving guidance, and driving direction.

In addition to one or more of the features described herein generating the cropped live video of the exterior view of the vehicle at the locations of the at least one opaque portion using the surround view module includes annotating the cropped live view with at least one of the vehicle driving speed, pedestrian detection information, and hazard identification, warning signals, driving guidance.

In another exemplary embodiment a method for generating see through view of a vehicle includes determining a position and orientation of a wearable vision system within the vehicle using a vehicle controller. The vehicle controller operates a simultaneous localization and mapping (SLAM) algorithm based at least in part on sensor information from a vehicle driver monitoring system. The method determines at least one opaque portion of the vehicle in a view of the driver based on the position and orientation of the wearable vision system within the vehicle and a three dimensional model of the vehicle. The method generates a cropped video feed of an exterior view of the vehicle at the position of the at least one opaque portion of the vehicle and outputs the cropped video feed to the wearable vision system.

In addition to one or more of the features described herein, the method includes displaying the cropped video feed to the driver using at least one screen of the wearable vision system.

In addition to one or more of the features described herein the simultaneous localization and mapping (SLAM) algorithm is performed exclusively on the vehicle controller.

In addition to one or more of the features described herein, the method further includes receiving image information from the wearable vision system, and wherein the determined position and orientation of the wearable vision system within the vehicle is further based on the image information from the wearable vision system.

In addition to one or more of the features described herein the received image information includes an image feed captured from a camera disposed on the wearable vision system.

In addition to one or more of the features described herein the image information further includes object identification of objects in the image feed.

In addition to one or more of the features described herein the three dimensional model of the vehicle defines relative positions and sizes of structural elements of the vehicle and defines which structural elements of the vehicle are opaque.

In addition to one or more of the features described herein generating the cropped video feed of an exterior view of the vehicle includes disabling the cropped video feed in response to identifying a driving speed of the vehicle exceeding a threshold.

In addition to one or more of the features described herein generating the cropped video feed of an exterior view of the vehicle includes adding a driving parameter display of the vehicle to the exterior view, wherein the driving parameter display includes at least one of driving speed, navigation system directions, hazard detection and pedestrian detection.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
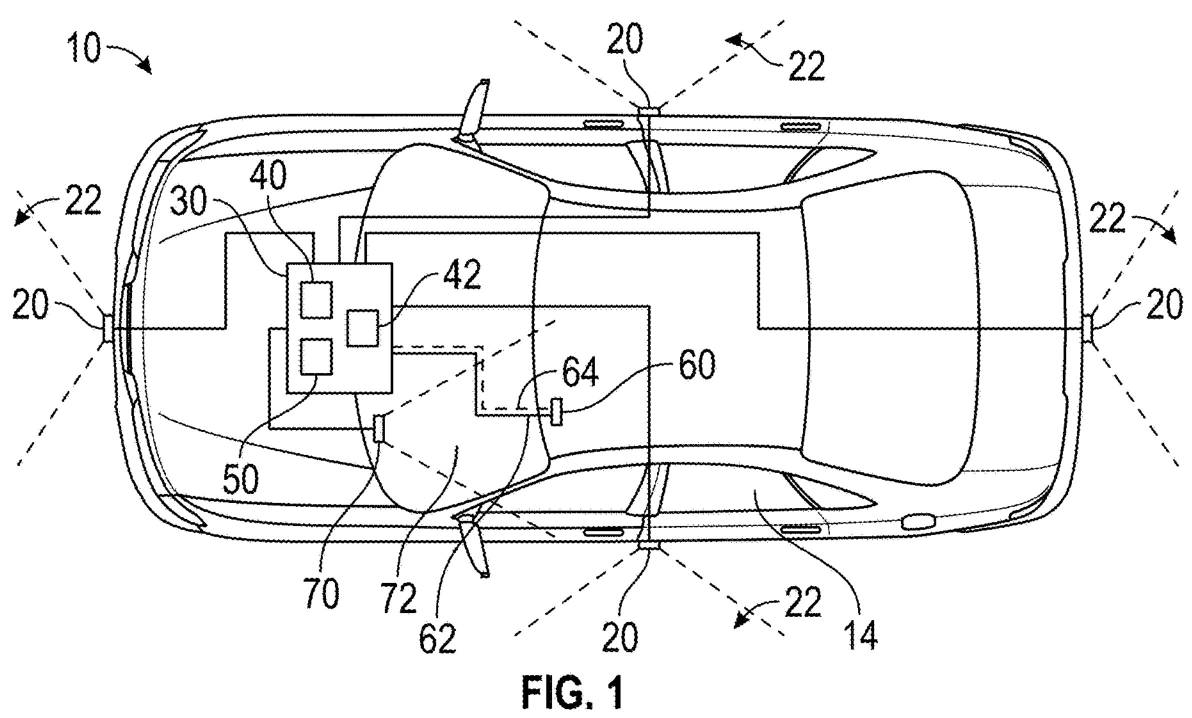
FIG. 1 is a vehicle including a see through viewing system.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term controller refers to a dedicated controller including a processor and memory, a general systems processor and memory storing software modules for implementing specific control processes, a network of interconnected processors and memory configured to cooperatively implement one or more control subroutines, or any similar configuration of processors and memory able to implement the control operations described herein.

As used herein, wearable vision systems refers to any wearable display screen including smart glasses, augmented reality equipped systems, and the like.

In a general example, a vehicle see through visualization system (STVS) utilizes vehicle processor and computational power to perform a simultaneous localization and mapping (SLAM) process to determine a position and orientation of the wearable vision system relative to the vehicle. The vehicle processors compare the position and orientation of the wearable vision system to a three dimensional model of the vehicle and determine which portions of a screen of the wearable vision system are oriented toward an opaque portion of the vehicle structure. Based on this determination, the vehicle processors cause the screen to display images of the exterior of the vehicle beyond the opaque portions of the vehicle structure at the identified portions of the screen.

By using this architecture, while wearing the wearable vision system, the operator of the vehicle is provided a view comparable to the view that would be available if the vehicle were not opaque, thereby effectively eliminating blind spots. Furthermore, by implementing augmented reality features using the vehicle processors, the STVS allows augmented reality features, including SLAM based visualization, to be implemented on any number of wearable visualization systems, even when the wearable visualization system lacks internal hardware and software to implement the augmented reality. In addition, the STVS allows some implementations of the visualization system to be hardware agnostic and presents the same see through vehicle visualization to any user regardless of the manufacturer or model of wearable vision system that they may be utilizing.

In accordance with an exemplary embodiment, FIG. 1 illustrates a vehicle 10. The vehicle 10 includes a set of exterior facing imaging sensors 20, each of which defines a field of view 22 facing away from the vehicle 10. While illustrated in the example FIG. 1 as including four distinct imaging sensors 20, it is appreciated that the vehicle 10 may include any number of exterior facing imaging sensors 20 in a sufficient number and positioning to generate a full surround view of the vehicle 10.

Figure 4:
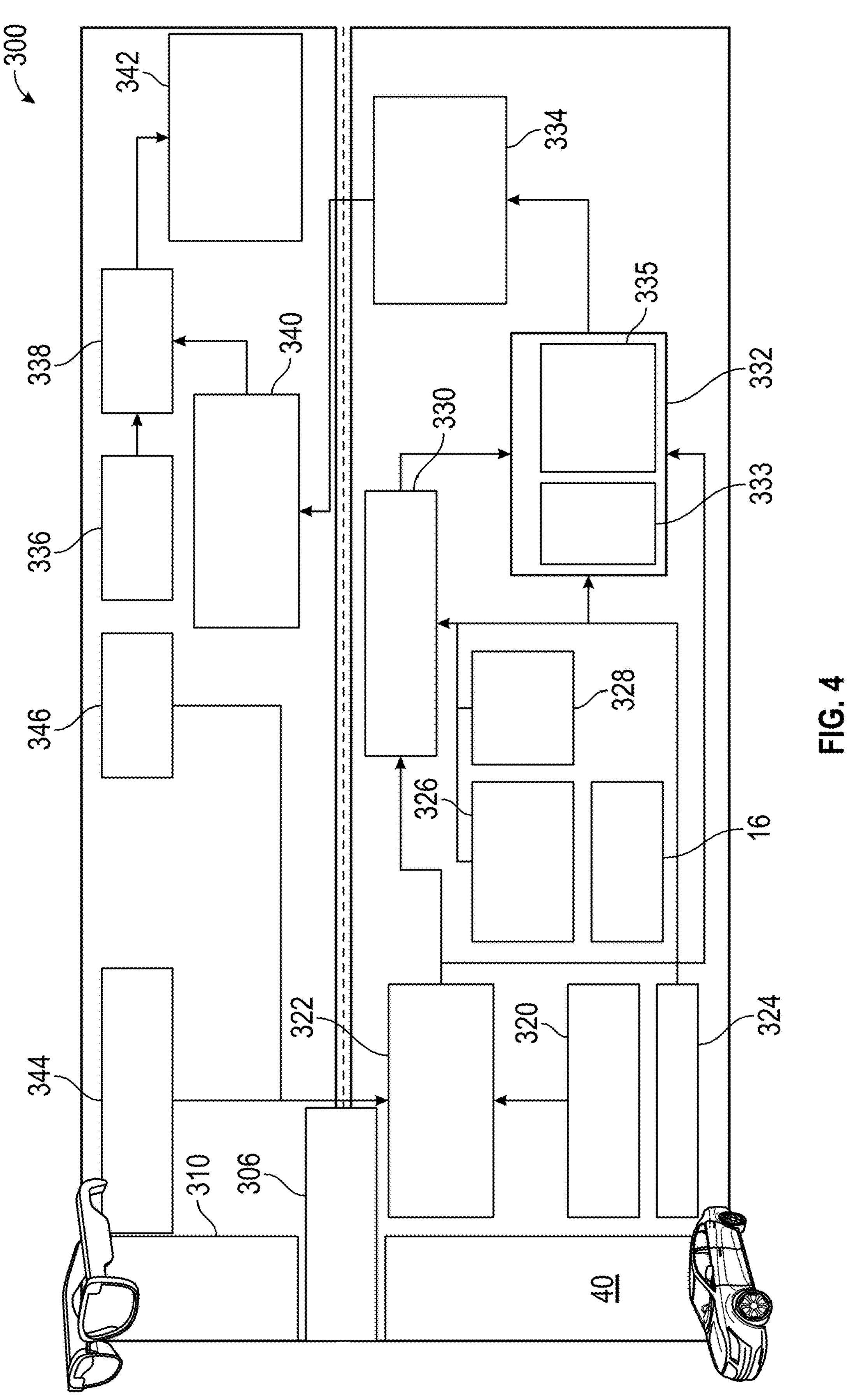
FIG. 4 is a system architecture for implementing the see through viewing system within the vehicle of FIG. 1.

Each of the imaging sensors 20 provides a sensed image to a controller 30. The controller 30 includes a vehicle portion 40 of the STVS architecture 300 (illustrated in detail at FIG. 4) and a surround view generation module 50. The controller 30 may be a dedicated STVS system controller including a memory and a processor, a sub portion of general controller, a network of controllers configured to communicate with each other and cooperatively implement the surround view generation module 50 and the vehicle portion 40 of the STVS architecture 300, or any similar computer controller configuration including a memory and a processor and being arranged to implement the systems described herein.

Also connected to the controller 30 is a wearable vision system 60, such as a pair of smart glasses. The wearable vision system can be connected to the controller 30 either directly, via a wired connection 62, via an indirect wired connection through one or more additional vehicle 10 systems, or via a wireless connection 64. The wireless connection can be any wireless connection protocol including, but not limited to, blue tooth connections.

At least one interior facing camera 70 defines a field of view 72 including the vehicle operator and the wearable device 60 being worn by the vehicle operator. In some examples, additional interior facing cameras and other sensor types may be incorporated in a cabin 14 of the vehicle 10. The interior facing camera 70, as well as any other available interior sensors, are connected to the controller 30, and provide the sensed information to a driver tracking module 42 of the controller 30. In examples the wearable vision system includes positioning sensors and/or functionality to generate addition information, the position and/or additional information is provided to the driver tracking module 42 but is not a requirement for the STVS to operate. The driver tracking module 42 combines interior cabin 14 sensing information to track the driver of the vehicle 10, and particularly a gaze or view direction and position of the driver.

Figure 2:
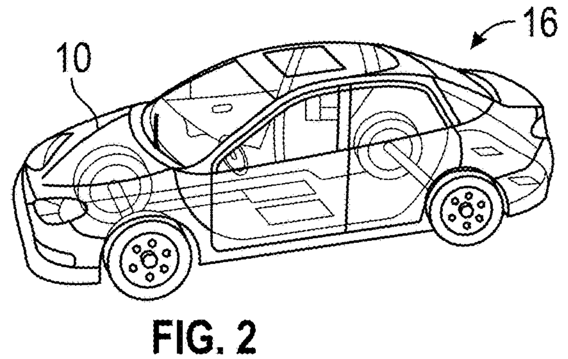
FIG. 2 is a three dimensional model of the vehicle of FIG. 1, stored in a control system of the vehicle.
Figure 3:
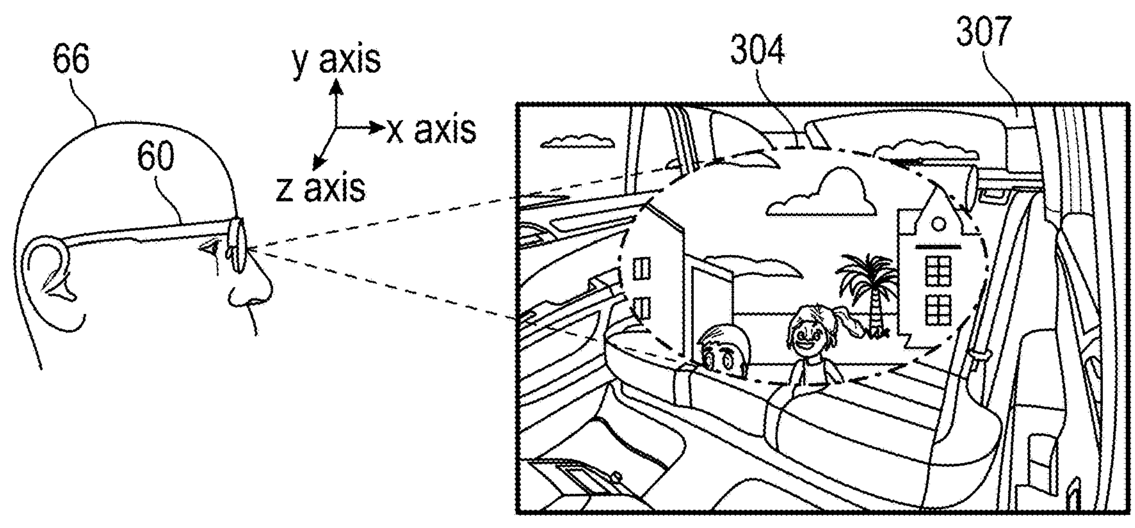
FIG. 3 is an example operation of the see through viewing system of FIG. 1.

With continued reference to the vehicle 10 of FIG. 1, FIG. 2 illustrates a three dimensional model 16 of the vehicle 10 included in a memory of the controller 30, or another memory accessible by the controller 30. FIG. 3 illustrates the wearable vision system 60, as a pair of smart glasses, being worn by a driver 66 while the driver 66 is looking at a rear portion 307 of the vehicle 10.

The three dimensional model 16 of the vehicle 10 provides relative positions and sizes of structural elements of the vehicle 10. The structural elements define which portions of the vehicle 10 can be seen through (e.g. windows), and which portions are opaque. By positioning the wearable vision system 60 within the three dimensional model 16, and determining the orientation of the wearable vision system 60 using the driver monitoring feature 42 and the SLAM modules of the vehicle portion 40 of the STVS architecture 300, the controller 30 is able to identify which portions 304 of an exterior view would be viewed, but for the opaque portions of the vehicle 10 between the wearable vision system and the exterior. This portion 304 of the exterior view is then presented to the driver 66 using screens, projections or any form of presentation capabilities supported by the wearable vision system in the wearable vision system 60. Depending on the specifications of the wearable vision system 60 and the calculated opaque areas of interest, the portion 304 of the exterior view may be superimposed over an image of the full screen or may be the only portion of the screen including an image, with the remaining portion of the screen being transparent. In further examples, any alternate configuration for displaying the portions 304 of the exterior view to the driver 66, while simultaneously allowing the driver 66 to see the viewable portions, using the wearable vision system 60 may be implemented by the controller 30.

With continued reference to FIGS. 1-3, FIG. 4 illustrates an example architecture 300 for implementing an STVS system including a vehicle portion 40 and a wearable vision system portion 310 (collectively referred to as the STVS portions 40, 310) with lines indicating data connections and arrows indicting a general expected direction of data flow. In some examples, data on all connections can be two way, and the general flow direction is the direction of data flow for the majority of data flow across the connection. The STVS portions 40, 310 are interconnected via a data link 306. The data link 306 can be wireless, wired, or a combination of wireless and wired. In some examples, the data link can further include indirect communication links through one or more general vehicle systems including, but not limited to, a connection through a general vehicle controller, a vehicle communication bus, or any similar connection.

The vehicle portion 40 of the architecture 300 includes the in-vehicle sensors 320 (ex. the interior facing camera 70), a central SLAM processing module 322, driving information 324 received from the controller 30 and/or other vehicle systems, the three dimensional model 16, a data set 326 identifying opaque and non-opaque portions of the vehicle 3D model 16, a data set 328 identifying any user settings, a data set 330 identifying mandatory viewing zones of the vehicle 10 (e.g., blind spots for lane merges), a vehicle surround view system (SVS 332), and a blocked view output 334 configured to output the portions of the exterior view that are blocked by opaque portions of the vehicle 10.

The wearable vision system portion 310 includes a data set 336 identifying user settings, a screen 338 or other image display (referred to generally as a screen 338), and a received video stream 340 including data elements defining where on the screen the received video stream 340 should be positioned. These features 336, 338, 340 operate cooperatively to output the live video 342 on the screen 338. In some examples, the wearable vision system portion 310 includes internal sensors 344 (e.g. position and direction sensors) and/or image recognition software 346. In systems including the image recognition software 346, the software 346 is configured to identify one or more objects in a recorded image provided from a camera on the wearable vision system 60.

During operation of the STVS architecture 300, the central SLAM hub 322 receives data from the in-vehicle sensors 320 from any available internal sensors 344 of the wearable vision system 310 and any image recognition 346 performed by the wearable vision system 310. The SLAM hub 322 then uses the received information to perform a simultaneous localization and mapping process that identifies the position and orientation of the wearable vision system 60 within the vehicle 10. The position and orientation of the wearable vision system 60 is provided to the in-vehicle SVS 332. In addition, the position and orientation is processed with the three dimensional model 16 and the dataset 326 identifying the viewable and non-viewable areas for the dataset 330. The dataset 330 is provided to the in-vehicle SVS 332. The in-vehicle SVS 332 also receives the driving information 324, including vehicle speed, direction, and other detected driving characteristics.

Using the received data, the in-vehicle SVS 332 a 360 degree live video feed 333 is generated and the live video feed 333 is annotated with driving information 335, and the in-vehicle SVS 332 generates the cropped live video 334, with the cropped live video feed 334 being a feed that is only positioned to fill in the opaque areas in the required viewing areas.

The cropped live video feed 334 is provided as the video stream 340, and to the wearable vision system display 338. The wearable vision system 60 then outputs the live video stream 342 on the corresponding screens and the driver 66 is provided with the view 304, FIG. 3, of the external environment through the wearable vision device 60.

By executing the calculations of the projected area requirements around the vehicle 10 in the vehicle rather than in the wearable vision system, the STVS architecture 300 reduces the computation requirements demanded of the wearable vision system, improving performance and increasing compatibility to a wider range of wearable vision systems. In addition, some implementations support the addition of on video annotation that were calculated by the vehicle's surround video system 332 system without increasing the computation requirements for the wearable vision system.

Using this architecture 300 the vehicle 10 becomes the augmented reality processing device, implementing the different computations required by a standard augmented reality device at the controller 30 while using the wearable vision system 60 as a display.

In some examples, the in-vehicle SVS 332 can further provide image correction and alignment adjustment of the video streams generated by the imaging sensor 20 to match the video streams captured by the imaging sensors 20 with the actual surrounding of the vehicle 10, and with each other. This operation aligns the images from the imaging sensors 20 so that the images connect seamlessly. In yet further implementations, an additional level of image correction can be performed on the cropped live video in the wearable vision system 310 when the wearable vision system 310 includes processing hardware and software able to perform device specific image correction.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A see through vision system for a vehicle comprising:

a surround view system including a plurality of exterior facing cameras, each of the exterior facing cameras being in communication with a controller;

a driver monitoring system including at least one driver monitoring sensor configured to monitor a viewing direction of a driver, the at least one driver monitoring sensor being in communication with the controller;

the controller including a non-transitory memory storing a three dimensional model of the vehicle, a simultaneous localization and mapping (SLAM) module, a surround view module, and a data link for connecting to a wearable vision system; and the controller further storing instructions for identifying a viewing direction of the driver using the driver monitoring system, determine a position and orientation of the wearable vision system relative to the vehicle based at least in part on image information from the wearable vision system, identifying at least one opaque portion of the vehicle in the driver's view using the viewing direction and the three dimensional model of the vehicle, generating a cropped live video of an exterior view of the vehicle at locations of the at least one opaque portion using the surround view module, and exporting the generated cropped live video to the wearable vision system using the data link.

2. The vehicle of claim 1, wherein the at least one driver monitoring sensor includes an interior facing camera defining a field of view including a head of the driver.

3. The vehicle of claim 1, wherein the SLAM module is configured to determine the position and orientation of the wearable vision system relative to the vehicle based at least in part on the viewing direction of the driver using a simultaneous localization and mapping algorithm.

4. The vehicle of claim 3, wherein the SLAM module is further configured to receive at least one of sensor information and image information from the wearable vision system through the data link, and the SLAM module is configured to determine a position and orientation of the wearable vision system relative to the vehicle based at least in part on the viewing direction of the driver and the at least one of sensor information and image information from the wearable vision system.

5. The vehicle of claim 4, wherein the image information includes an image feed captured from a camera disposed on the wearable vision system.

6. The vehicle of claim 5, wherein the image information further includes object identification of objects in the image feed.

7. The vehicle of claim 3, wherein the simultaneous localization and mapping algorithm is performed exclusively on the controller.

8. The vehicle of claim 1, wherein the three dimensional model of the vehicle defines relative positions and sizes of structural elements of the vehicle and defines which structural elements of the vehicle are opaque.

9. The vehicle of claim 1, wherein the vehicle further includes a set of vehicle operation sensors, the vehicle operation sensors being configured to identify a vehicle driving speed, vehicle location, hazard identification, warning signals, driving guidance, and driving direction.

10. The vehicle of claim 9, wherein generating the cropped live video of the exterior view of the vehicle at locations of the at least one opaque portion using the surround view module includes annotating the cropped live view with at least one of the vehicle driving speed, pedestrian detection information, and hazard identification, warning signals, driving guidance.

11. A method for generating see through view of a vehicle comprising:

determining a position and orientation of a wearable vision system within the vehicle using a vehicle controller, the vehicle controller operating a simultaneous localization and mapping (SLAM) algorithm based at least in part on sensor information from a vehicle driver monitoring system;

receiving image information from the wearable vision system, and wherein the determined position and orientation of the wearable vision system within the vehicle is further based on the image information from the wearable vision system;

determining at least one opaque portion of the vehicle in a view of a driver based on the position and orientation of the wearable vision system within the vehicle and a three dimensional model of the vehicle;

generating a cropped video feed of an exterior view of the vehicle at the position of the at least one opaque portion of the vehicle; and outputting the cropped video feed to the wearable vision system.

12. The method of claim 11, further comprising displaying the cropped video feed to the driver using at least one screen of the wearable vision system.

13. The method of claim 11, wherein the simultaneous localization and mapping (SLAM) algorithm is performed exclusively on the vehicle controller.

14. The method of claim 11, wherein the received image information includes an image feed captured from a camera disposed on the wearable vision system.

15. The method of claim 14, wherein the image information further includes object identification of objects in the image feed.

16. The method of claim 11, wherein the three dimensional model of the vehicle defines relative positions and sizes of structural elements of the vehicle and defines which structural elements of the vehicle are opaque.

17. The method of claim 11, wherein generating the cropped video feed of an exterior view of the vehicle includes adding a driving parameter display of the vehicle to the exterior view, wherein the driving parameter display includes at least one of driving speed, navigation system directions, hazard detection and pedestrian detection.

18. A method for generating see through view of a vehicle comprising: determining a position and orientation of a wearable vision system within the vehicle using a vehicle controller, the vehicle controller operating a simultaneous localization and mapping (SLAM) algorithm based at least in part on sensor information from a vehicle driver monitoring system;

determining at least one opaque portion of the vehicle in a view of a driver based on the position and orientation of the wearable vision system within the vehicle and a three dimensional model of the vehicle;

generating a cropped video feed of an exterior view of the vehicle at the position of the at least one opaque portion of the vehicle by at least disabling the cropped video feed in response to identifying a driving speed of the vehicle exceeding a threshold; and outputting the cropped video feed to the wearable vision system while the driving speed of the vehicle is less than or equal to the threshold.

19. The method of claim 18, further comprising displaying the cropped video feed to the driver using at least one screen of the wearable vision system.

20. The method of claim 18, wherein the simultaneous localization and mapping (SLAM) algorithm is performed exclusively on the vehicle controller.

* * * * *